Patented Nov. 12, 1940

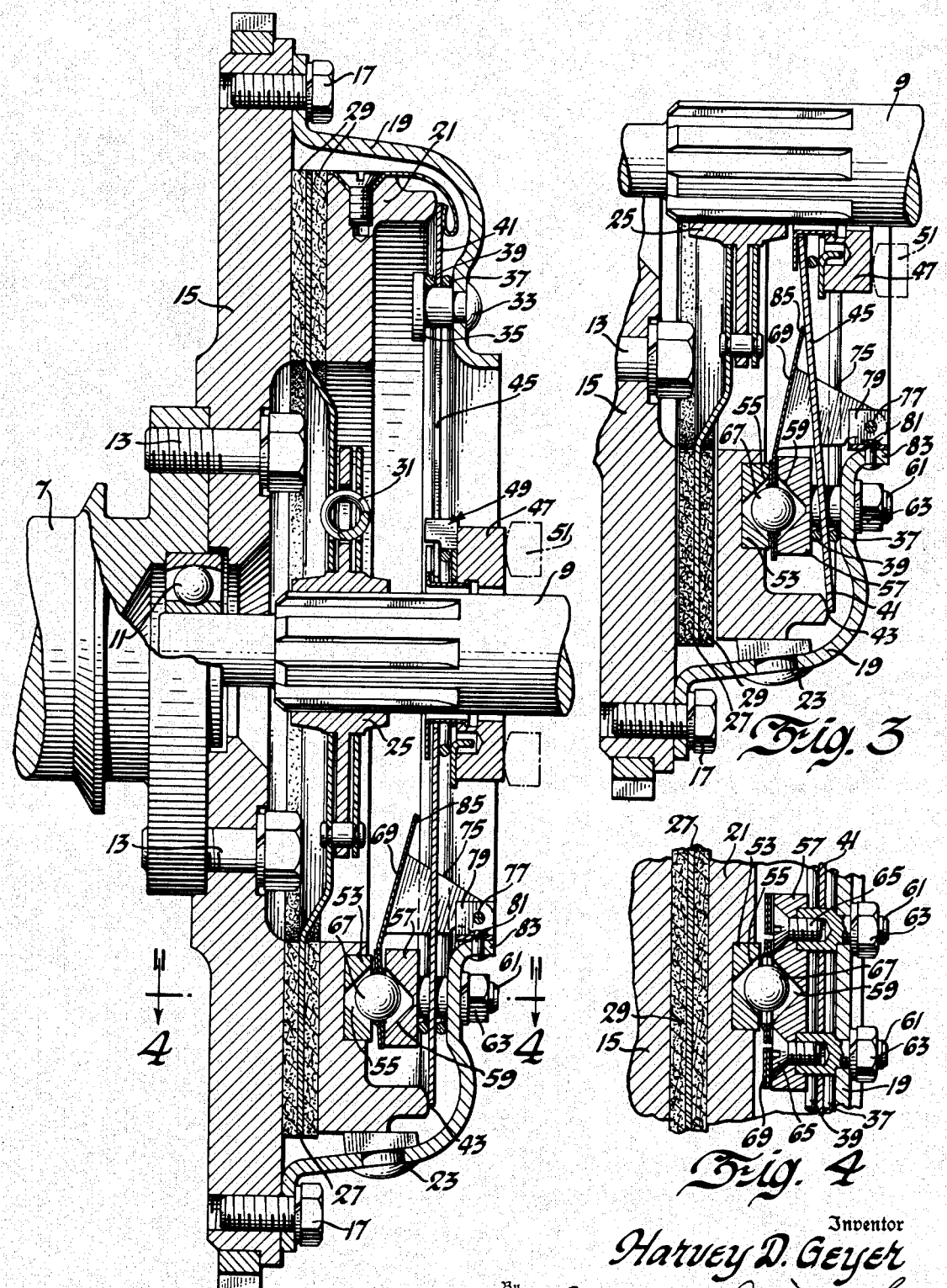

2,221,399

UNITED STATES PATENT OFFICE 2,221,399

CLUTCH

Harvey D. Geyer, Dayton, Ohio, assignor to General Motors Corporation, Detroit, Mich., a corporation of Delaware Application February 9, 1938, Serial No. 189,483

6 Claims. (Cl. 192—32)

This invention relates to friction clutches and has been designed more particularly to improve the clutch for coupling the engine shaft and transmission shaft of a motor vehicle.

An object of the invention is to add a self-energizing mechanism to assist the spring used in the conventional way to effect clutch engagement to couple the shafts.

As a further object the invention makes it possible to use a lighter clutch engaging spring. Being lighter the spring may therefore be less expensive.

A further and related object is the provision of a clutch so constructed as to reduce the pedal pressure required for clutch release.

Other objects and advantages will be understood from the following description.

On the accompanying drawings:

Figure 2 is a section on line 2—2 of Figure 1.

Figure 3 is a partial section corresponding to Figure 2, but showing the parts displaced from the position they occupy in Figure 2.

Figure 4 is a section on line 4—4 of Figure 2.

Figure 1:
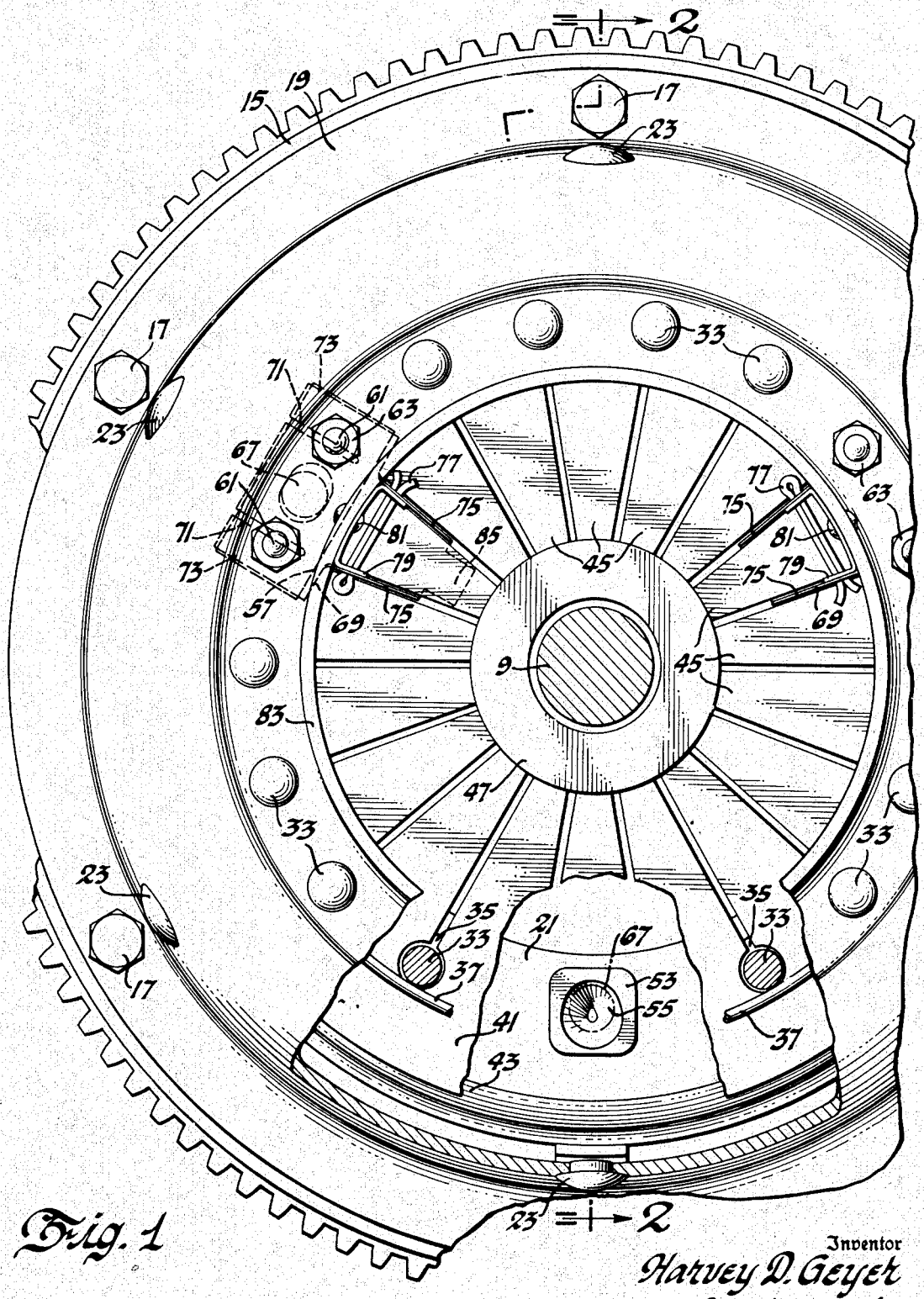
Figure 1 is a view of the clutch in elevation.

Numeral 7 represents the engine shaft and 9 the transmission shaft. The latter is piloted into the end of the former, an anti-friction bearing being provided at 11. Fastening means 13 secures to the engine shaft a flywheel 15. Secured to the flywheel by fastening means 17 is a cover 19 which also serves the purpose of a spring abutment. Within the cover is a pressure plate 21 mounted centrally relatively to the cover, suitable means 23 being provided to effect the centralization. This means permits axial sliding of the pressure plate relative to the cover.

The driven shaft 9 is provided with a hub 25 to which is secured a driven plate 27 with facings 29. Springs 31 provide a yielding resistance to a relative circumferential movement between the hub 25 and the plate 27.

A circular series of shouldered fulcrum pins 23 is carried by the cover plate. These pins have heads 35 and they support two rings 37 and 39. A main clutch spring in the form of a coned spring annulus serves to slide the pressure plate axially so that it grips the driven plate between itself and the flywheel. This main spring is marked 41. A circular series of openings in spring 41 embrace the fulcrum pins. The rings 37 and 39 are on opposite sides of the spring plate, one engaging the heads of the pins and the other the cover. The outer circular margin of the spring plate is in contact at 43 with the pressure plate. Inwardly from the circle of fulcrum pins the spring plate is slotted to form tongues 45. The tongues are collectively secured to a throwout collar 47 by suitable means designated as a whole by numeral 49. The collar is reciprocated by a throwout lever, only the forked ends 51 of which are shown.

A plurality of steel inserts 53 are distributed in a circular series about and carried by the pressure plate. Each insert is formed with a somewhat conical but radially elongated notch 55. Opposite each insert is a block 57 secured to the cover, the block axially spaced from the insert 53. The block, too, has a conical notch 59. To secure the block in position there are used shouldered studs 61 serving to space the block from the cover plate. The parts are secured in position by nuts 63 and machine screws 65. These fastening means are located within the circle defined by the fulcrum pins. A ball 67 is located between the opposite notches of each insert and block. The ball is also positioned within an opening provided therefor in a lever 69. The opening is dimensioned radially to accommodate the ball 67 but is elongated in a circumferential direction. That part of the lever which is located between the insert and block is of rectangular shape as shown by Figure 1. This rectangular part of the lever is provided with slots 71. The parts 73 of the lever between each slot and the adjacent edge is bent slightly so that its pressure against the block 57 tends to rock the lever clockwise and force the rectangular plate portion of the lever to the position shown in Figure 2, the ball moving radially toward the center of the clutch and into the more shallow parts of the opposed notches. When the ball is thus forced into the shallow parts of the notches it will be evident that the pressure plate 21 is forced toward the driven plate. This movement provides a self-energizing action which serves to supplement the action of the main clutch spring 41. As a result it makes possible the use of a lighter and therefore less expensive main spring. Since the spring is lighter, less pedal effort is required to overcome the spring action in the act of clutch release.

The lever has arms 75 which extend axially through adjacent slots of the spring and these arms are pivoted on a cotter pin 77 or the like which is carried by a bracket 79, the latter riveted or otherwise secured as at 81 to a flange 83 of the cover. The extreme inner end of the lever as at 85 is positioned to be free from contact with the main spring when the clutch is engaged. When however, the spring 41 is moved to release the clutch, the end of the lever is engaged by the adjacent face of the spring. The lever is then rocked about its pivot 77 and the ball 67 is moved radially outward to a position adjacent the deep parts of the notches, thus rendering inoperative the self-energizing device. When the pressure on the clutch pedal is released to permit spring 41 to effect clutch engagement, the resilient tongues 73 of the lever 69 again rock the lever to the position shown by Figure 2 and the ball moves into the shallower parts of the notches and the self-energizing action assists the spring.

It may be further explained that the torque is transmitted between the cover 19 and the pressure plate 21 not by lugs and slots as is common practice. When the clutch begins to engage there is a slight relative circumferential movement between parts 19 and 21 in consequence of the drag of the pressure plate as it contacts the driven plate. The resultant relative circumferential movement is shown by Figure 4. The slot in lever 69 is provided to accommodate the movement of the ball during such relative movement of parts 19 and 21. The motion is quite limited as the ball engages the faces of parts 53 and 57 and quickly stops such rotation. Thereafter parts 19 and 21 move jointly and torque is transmitted from the one to the other through the ball. After the lever 69 is rendered free to rotate as the clutch engages the ball is forced radially into narrower parts of the notches as is shown by Figure 2 to thereby supplement the action of the main spring. When the throwout mechanism overcomes the main spring it operates upon lever 69 to restore the ball 67 by an opposite radial movement and, since the pressure plate is no longer forced against the driven plate the ball returns to its intermediate position circumferentially.

I claim:

1. In a clutch, the first member comprising a rotatable element, a cover secured thereto and a pressure plate within said cover and rotatable slightly relatively to said cover and also movable axially relative thereto, a second member adapted to be gripped between said rotatable element and said pressure plate, a spring to press said pressure plate toward said second member, inserts and blocks mounted on adjacent faces of said pressure plate and cover respectively, said inserts and blocks having opposed recesses of variable depths, a ball positioned within each opposite pair of recesses, said ball operable to limit the relative rotation of said cover and pressure plate, a plurality of levers pivoted to said cover, each lever having one arm extending between said insert and block, said arm having an aperture embracing said ball, said lever having a second arm in the path of movement of said spring as it moves to clutch releasing position, said lever having resilient parts to bias said ball toward the shallow parts of said recesses.

2. The invention defined by claim 1, said resilient parts being formed as tongues bent from the plate of the lever arm and between an insert and block to engage the block and thereby rock the lever about its pivot axis.

3. In combination, a first shaft, a flywheel secured thereto, an abutment member secured to said flywheel, a pressure plate between said flywheel and abutment, said pressure plate being rotatable with said flywheel and reciprocable axially relative thereto, a second shaft, a driven disc carried thereby and positioned between said flywheel and pressure plate, a coned spring annulus operable to move said pressure plate toward said flywheel, wedging means between said abutment plate and pressure plate, said wedging means being normally operable to assist said spring annulus and means out of contact with said spring annulus when the clutch is engaged but adapted to be engaged by said spring annulus as the latter moves to clutch releasing position to render said wedging means inoperative.

4. The invention defined by claim 3, said wedging means comprising elements having opposed tapering recesses carried by said pressure plate and abutment plate, a ball in said opposed recesses, a lever pivoted to said cover, said lever having one arm in the path of movement of said spring and a second arm extending between said elements, said last named arm having a recess to engage said ball.

5. In a friction clutch including driving and driven members and a spring, one of said members having parts mounted for relative rotation, self-energizing devices between said parts, each device including opposed conical recesses in said parts and roller members in said recesses, said self-energizing devices adapted to supplement said spring in effecting clutch engagement, and means out of contact with said spring in its clutch engaged position but, in the released position of the clutch, adapted to engage and be moved by said spring to move said rollers to the deeper parts of said conical recesses and to thereby render inoperative said self-energizing devices.

6. The invention defined by claim 5, said last named means being a lever pivoted to one of said parts, said lever having a resilient finger yieldingly engaging one of said parts.

HARVEY D. GEYER.